INVENTOR
OTTO LEWIN
BY
[signature]
ATTORNEY

INVENTOR
OTTO LEWIN
BY [signature]
ATTORNEY

INVENTOR
OTTO LEWIN
BY
ATTORNEY

March 19, 1968 O. LEWIN 3,374,043

LEVER CONTROLLED COMPONENT LOCKING AND MOVING ARRANGEMENT FOR CABINETS

Filed Feb. 15, 1967 5 Sheets-Sheet 4

INVENTOR
OTTO LEWIN

BY [signature]

ATTORNEY

INVENTOR
OTTO LEWIN
BY Morris L. Pollack
ATTORNEY

United States Patent Office 3,374,043
Patented Mar. 19, 1968

3,374,043
LEVER CONTROLLED COMPONENT LOCKING AND MOVING ARRANGEMENT FOR CABINETS

Otto Lewin, York, Pa., assignor to The Leopold Company, Burlington, Iowa, a corporation of Delaware Filed Feb. 15, 1967, Ser. No. 616,250
24 Claims. (Cl. 312—219)

ABSTRACT OF THE DISCLOSURE

A lever, controlled component latching and moving apparatus for a cabinet utilizing a first leaf-type spring to urge the component from a position confined within the cabinet to a position exposed from the cabinet and a second leaf type spring to latch the component in its position confined within the cabinet and against the bias of the first spring. A lever is provided for each component to remove the latching spring from its latching position and permit the other spring to move the component and a lock actuated plate is provided to prevent actuation of the levers and lock all components in place. Information carrying buttons may furthermore be provided to indicate the nature of the components and connectors utilized between lock actuated plates of adjacent cabinets to permit the utilization of a single lock for locking plural cabinets.

*Background of the invention—field of application*

This invention relates to component latching and moving structure, and more particularly to apparatus for latching a drawer within the confines of a cabinet, for releasing such latch, and for urging the drawer once released to a position exposed from the confines of the cabinet to expose the contents thereof.

*Background of invention—description of prior art*

Components, in the form of drawers, that are used in most cabinets, and more particularly for cabinets utilized as filing cabinets and/or as pedestals of desks or credenzas are almost invariably provided with handles protruding from the face thereof to facilitate movement of the component between a position disposed within the confines of the cabinet and a position removed from the confines of the cabinet. The provision of such handles almost invariably detracts from the esthetics of the cabinet and component design. In those cabinets where handles are not utilized a space must be provided around the component or drawer to permit grasping thereof to facilitate such movement. The provision of such a space not only detracts from the esthetics of the cabinet but in most instances, and especially where the component or loaded drawer is heavy, it creates a burden during the movement of such component.

In addition, due to the difficulties in obtaining a proper leveling of the cabinet it has become common practice to detent the components in their positions confined within the cabinet; however, those detents which function properly to retain the component within the confines of the cabinet are difficult to overcome by merely exerting a pulling force upon the face of the component while those detents which are easy to overcome do not in most cases properly function to retain the component within the confines of the cabinet.

In an effort to overcome the above enumerated difficulties some cabinets such as the one shown in U.S. Patent 3,109,686 utilize a positive latch for retaining the component within the confines of the cabinet, a push button operated mechanism for releasing such latch, and in some instances a spring bias on the component to urge same from its position confined within the cabinet.

The great majority of such constructions have been found to be so complex, so difficult to install, so inefficient in operation, and so expensive that very few, if any, have been commercialized.

*Summary of invention*

It is therefore an object of this invention to provide an improved component latching and moving apparatus for a cabinet.

It is a further object to provide an improved lever controlled component latching and moving apparatus for a multiple component cabinet.

A still further object is to provide a lever operated component latching and moving apparatus wherein push buttons are provided for operating the levers, and wherein the push buttons carry indicia indicating the nature of the component associated therewith.

Another object is to provide an improved cabinet locking apparatus which through simple means can be connected with similar cabinet locking apparatus such that only one lock need be provided for multiple cabinets.

This invention involves multiple drawer cabinets, of the type used for filing and of the type used as pedestals for desks, credenzas and the like, wherein each drawer of the cabinet is normally urged by resilient biasing means from a position confined within the cabinet to a position exposed from the cabinet to provide access to the contents of the drawer, and wherein each drawer is normally retained in its position confined within the cabinet by a latch which is released through operation of a lever; and contemplates providing first leaf type springs for urging each drawer from its position confined within the cabinet and other leaf type springs for latching each drawer in its position within the cabinet, as well as a simplified and efficient lever mounting and a spring mounting structure readily adaptable to latch and move different numbers of drawers.

In carrying out the invention, according to a preferred embodiment thereof, the cabinet has installed therein a spring mounting plate formed with a plurality of sets of spring guide straps and spring retaining lances arranged to receive drawer opening and drawer latching springs in selected positions such that the plate may be utilized with different arrangements of different size drawers and more specifically will accommodate from two to five drawers. The springs are each formed as leaf type springs to be received within the straps, and are retained in position by cooperating with said straps and with the lances formed on the plate. The drawer latching springs not only perform the latching function but also perform a biasing function for retaining the latch portion thereof in cooperative relationship with a catch on the drawer, and for retaining the drawer operating levers in their inoperative positions.

A lock operated lock bar is disposed for coaction with the drawer operating levers to either permit or restrain operation thereof and thus acts as a lock for the drawers; while a simple connector is provided for interconnecting two of such lock bars together to thus permit the locking of the drawers in a pair of adjacent cabinets through a single lock.

Other objects, features, and advantages of the invention in its details of construction and arrangement of parts, will be seen from the above, from the following description of the preferred embodiment when considered in conjunction with the drawings, and from the appended claims.

*Description of preferred embodiment*

For convenience, the invention will be described as applied to a multiple drawer cabinet of the type commonly used as a pedestal for a desk; it being understood nevertheless that without departing from the scope of this invention that subject lever controlled latching and moving apparatus may be applied to multiple drawer cabinets of the type used for filing papers, as cabinet sections of a credenza, or for any other cabinet wherein there are one or more components movable between a position confined within the cabinet and a position exposed therefrom.

Figure 1:
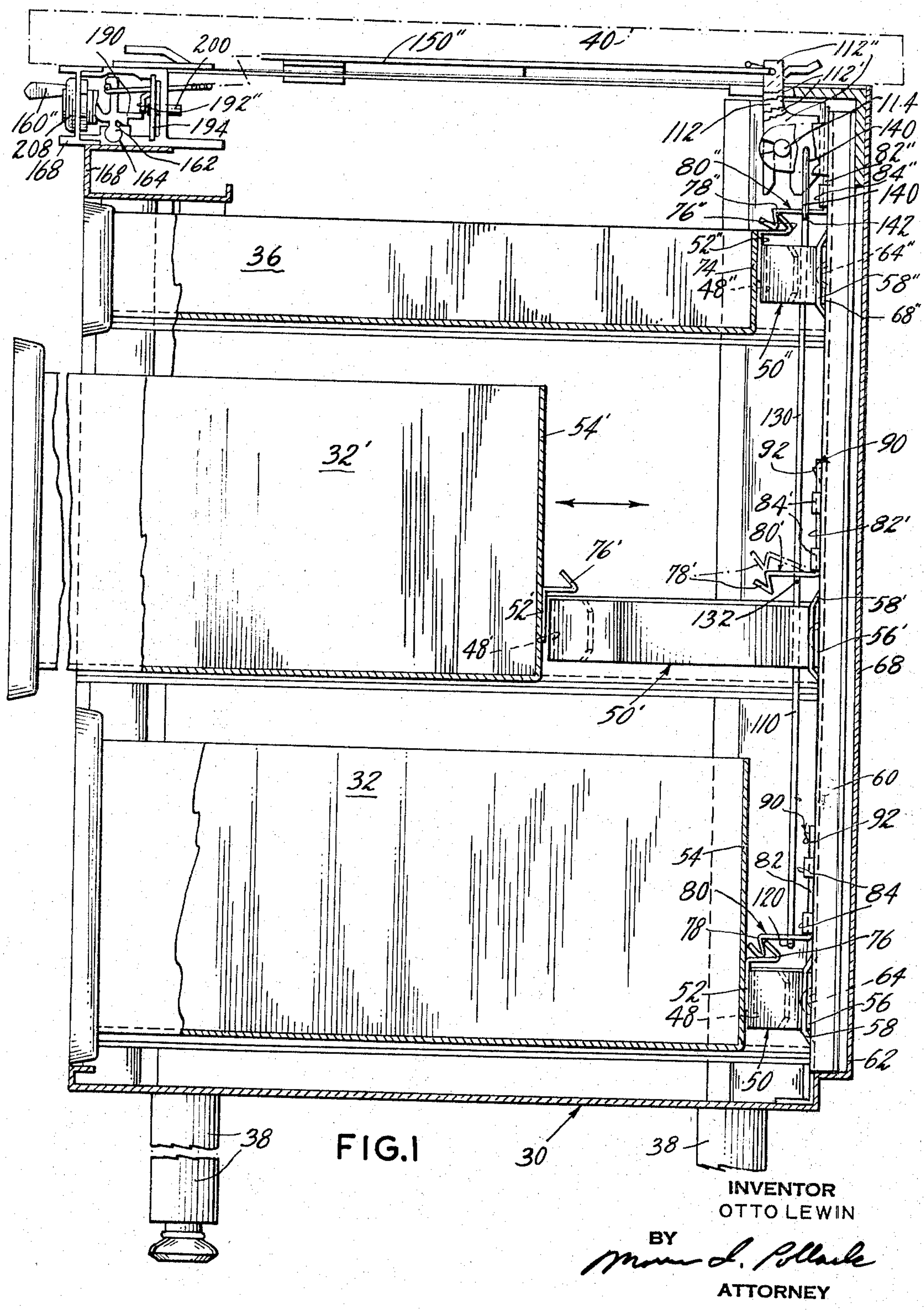
FIG. 1 is a side elevational view, in partial section, of a cabinet showing the details of a lever controlled drawer locking and moving mechanism embodying the present invention.

With reference to FIG. 1 there is shown generally at 30 a cabinet provided with a pair of box drawers 32, 32′ and a half-size or personal drawer 36 all of which are disposed in cabinet 30 on conventional suspension mechanisms (not shown) for movement between positions confined within cabinet 30 (as shown for drawers 32 and 36) and positions extending from cabinet 30 to expose the contents thereof (as shown for drawer 32′). Suitable legs 38 and a suitable top 40 are provided for cabinet 30.

Figure 2:
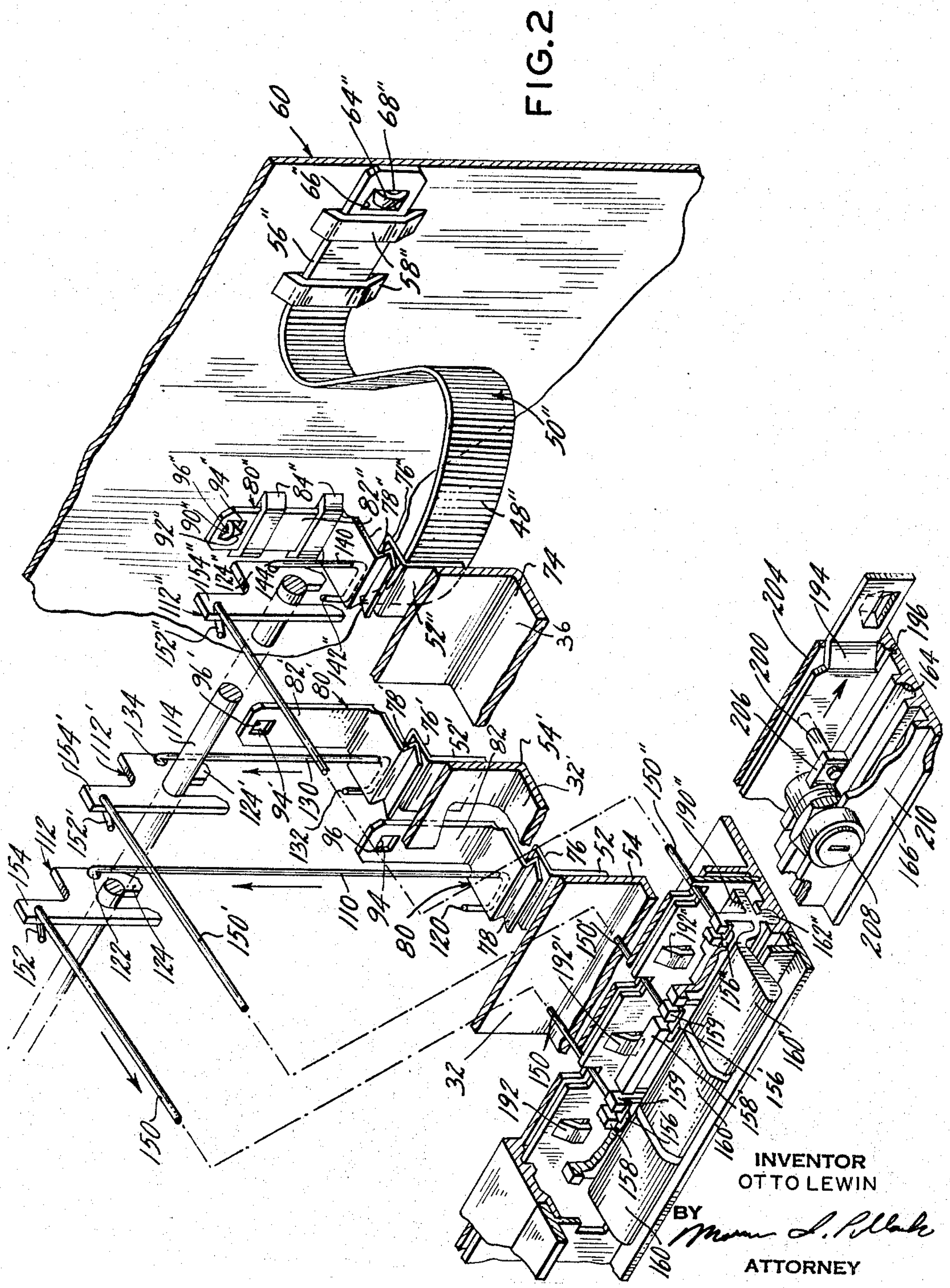
FIG. 2 is a perspective view of the lever controller drawer locking and moving mechanism of FIG. 1, sectioned and cut away in parts, and otherwise arranged to better show the details and operation thereof.
Figures 3, 5:
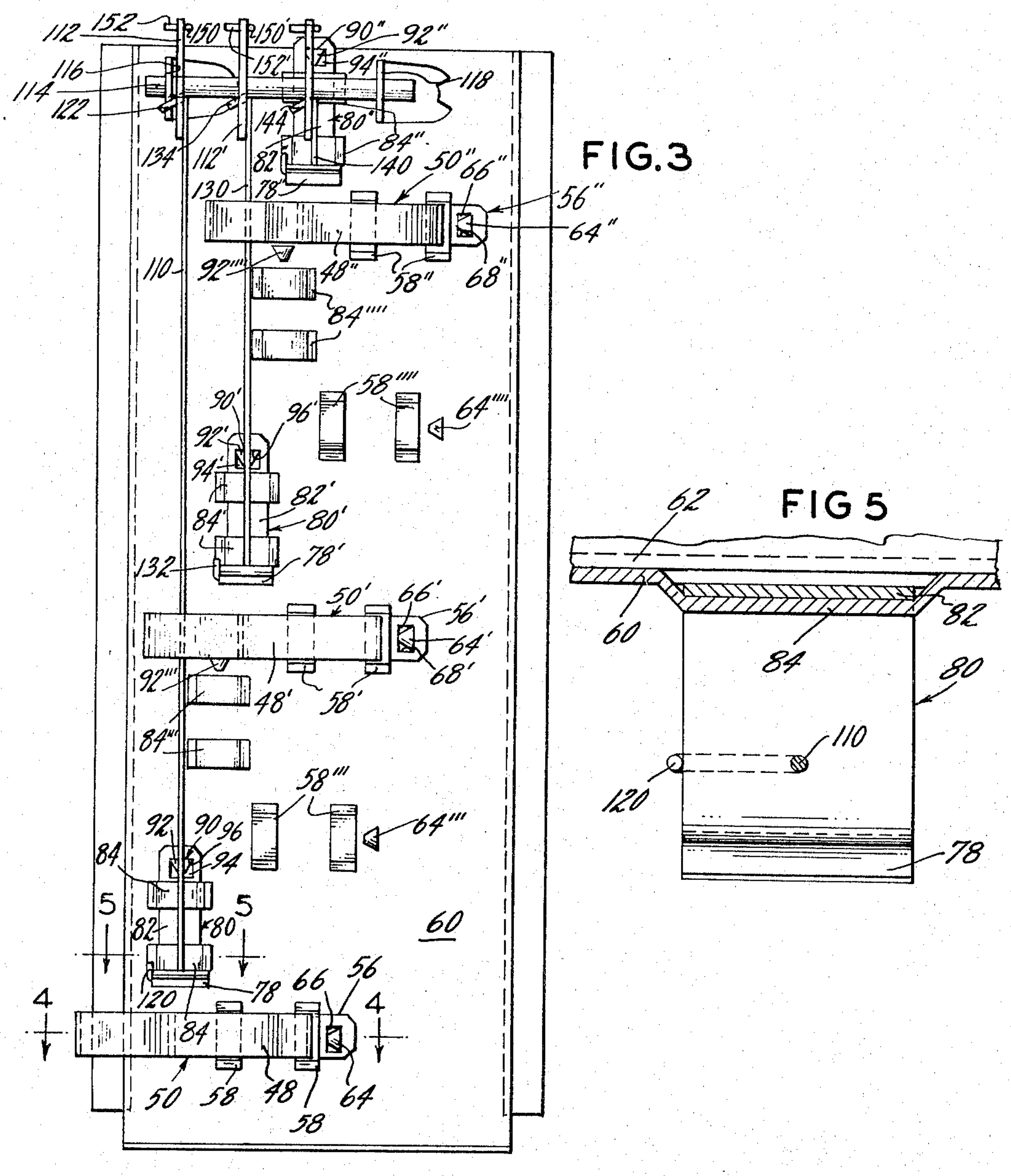
FIG. 3 is a front elevational view of the mounting plate of FIG. 1.
FIG. 5 is a sectional view taken on line 5—5 of FIG. 3.
Figure 4:
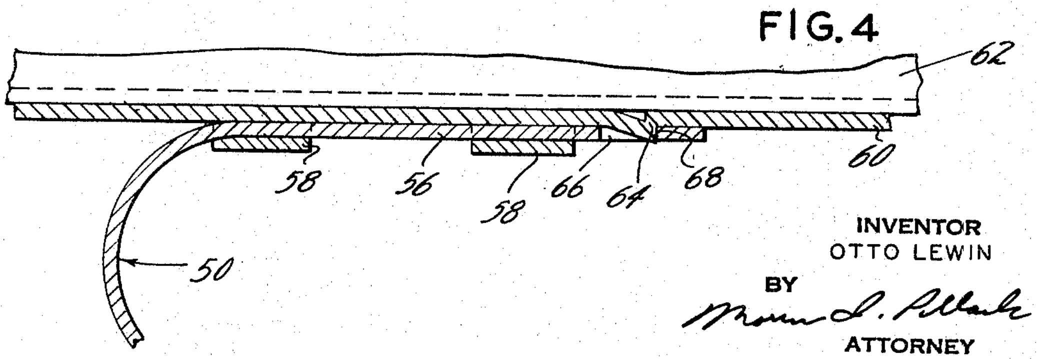
FIG. 4 is a sectional view taken on line 4—4 of FIG. 3.

The free end 48 (FIGS. 1 and 3) of a leaf type drawer opening spring 50 is disposed for engagement with a catch plate 52 (FIGS. 1 and 2) mounted on a rear wall 54 of drawer 32 to urge drawer 32 from the position thereof disposed within the confines of cabinet 30 to a position extending from cabinet 30 to expose the contents thereof (as shown for drawer 32′ in FIG. 1). Another or secured end 56 of spring 50 is positioned behind a pair of vertically disposed straps 58 (FIGS. 1, 3, and 4) formed from the material of a support plate 60 appropriately secured to a rear wall 62 (FIGS. 1 and 4) of cabinet 30. A lanced projection 64 (FIGS. 3 and 4) extends from support plate 60 into an aperture 66 formed in secured end 56 of spring 50 for engagement with an edge 68 (FIG. 4) of aperture 66 to prevent withdrawal of spring 50 from its position behind straps 58 on support plate 60.

The free end 48′ (FIGS. 1 and 3) of a leaf type drawer opening spring 50′ is disposed for engagement with a catch plate 52′ (FIGS. 1 and 2) mounted on a rear wall 54′ of drawer 32′ and the secured end 56′ (FIGS. 1 and 3) of spring 50′ is positioned behind vertically disposed straps 58′ formed from the material of support plate 60.

A lanced projection 64′ (FIG. 3) extends from support plate 60 into an aperture 66′ formed in secured end 56′ of spring 50′ for engagement with an edge 68′ of aperture 66′ to prevent withdrawal of spring 50′ from behind straps 58′.

The free end 48″ (FIGS. 1, 2, and 3) of a leaf type drawer opening spring 50″ is disposed for engagement with a catch plate 52″ (FIGS. 1 and 2) mounted on a rear wall 74 of drawer 36 and the secured end 56″ of spring 50″ (FIGS. 1, 2, and 3) is disposed behind a pair of vertically disposed straps 58″ formed from the material of support plate 60. A lanced projection 64″ (FIGS. 2 and 3) extends from support plate 60 into an aperture 66″ formed in secured end 56″ of spring 50″ for engagement with an edge 68″ of aperture 66″ to prevent withdrawal of spring 50″ from its position behind straps 58″.

Additional pairs of vertically disposed straps 58‴ (FIG. 3) and 58⁗ and additional lanced projections 64‴ and 64⁗ may be formed from the material of support 60 as desired to facilitate the use of support plate 60 in cabinets having different drawer arrangements.

A lip 76 (FIGS. 1 and 2), formed on catch plate 52, is disposed for coaction with a nose 78 formed on a latch spring 80. A support leg 82 (FIGS. 1, 2, and 3) of latch spring 80″ is disposed behind a pair of horizontally disposed support straps 84 (FIGS. 1 and 3) formed from the material of support plate 60. The upper edge 90″ of a lanced projection 92 formed from the material of support plate 60 extends into an aperture 94 (FIGS. 2 and 3) formed in leg 82 of latch spring 80 for engagement with an edge 96 of aperture 94 to prevent withdrawal of latch spring 80 from behind straps 84.

A lip 76′ (FIGS. 1 and 2) formed on catch plate 52′, is disposed for coaction with a nose 78′ formed on a latch spring 80′. A support leg 82′ (FIGS. 1, 2, and 3) of latch spring 80′ is disposed behind a pair of horizontally disposed support straps 84′ (FIGS. 1 and 3) formed from the material of support plate 60. The upper edge 90′ of a lanced projection 92′ formed from the material of support plate 60 extends into an aperture 94′ (FIGS. 2 and 3) formed in leg 82′ of latch spring 80′ for engagement with an edge 96′ of aperture 94′ to prevent withdrawal of latch spring 80′ from behind straps 84′.

A lip 76″ (FIGS. 1 and 2), formed on catch plate 52″, is disposed for coaction with a nose 78″ formed on a latch spring 80″. A support leg 82″ (FIGS. 1, 2 and 3) of latch spring 80″ is disposed behind a pair of horizontally disposed support straps 84″ (FIGS. 1 and 3) formed from the material of support plate 60. The upper edge 90″ of a lanced projection 92″ formed from the material of support plate 60 extends into an aperture 94″ (FIGS. 2 and 3) formed in leg 82″ of latch spring 80″ for engagement with an edge 96″ of aperture 94″ to prevent withdrawal of latch spring 80″ from behind straps 84″.

Additional pairs of horizontally disposed straps 84‴ and 84⁗ and additional lanced projections 92‴ and 92⁗ may be formed from the material of support plate 60 as desired to facilitate the use of support plate 60 in cabinets having different drawer arrangements.

A pull rod 110 (FIGS. 1, 2 and 3) interconnects latch spring 80 to a bell crank 112 rockably disposed on a rock shaft 114 carried by a pair of shaft supports 116 (FIG. 3) and 118 formed from the material of support plate 60. An end 120 (FIGS. 1, 2 and 3) of pull rod 110 extends into an aperture appropriately formed in latch spring 80 and underneath same to interconnect pull rod 110 to latch spring 80; while the other end 122 of pull rod 110 (FIGS. 2 and 3) extends through an aperture appropriately formed in a leg 124 of bell crank 112.

A pull rod 130 extends from latch spring 80′ to a bell crank 112′ disposed on rock shaft 114, with an end 132 (FIGS. 1 and 2) of pull rod 130 extending through and beneath latch spring 80′ and with the other end 134 of pull rod 130 extending through an aperture appropriately formed in a leg 124′ of bell crank 112′.

A pull rod 140 (FIGS. 1, 2 and 3) interconnects latch spring 80″ to a bell crank 112″ disposed on rock shaft 114 with an end 142 of pull rod 140 (FIGS. 1 and 2) extending through and beneath latch spring 80″ and the other end 144 of pull rod 140 (FIGS. 2 and 3) extending through an aperture appropriately formed in a leg 124″ of bell crank 112″.

An operating rod 150 (FIGS. 2 and 3) is interconnected to bell crank 112 by having an end 152 thereof extend through an aperture appropriately formed in an arm 154 of bell crank 112. The other end 156 (FIGS. 2 and 8) of operating rod 150 is formed in the shape of a T and lodged beneath a pair of spaced lugs 158, 159 (FIGS. 2 and 7) formed on an actuating lever 160 which also has formed thereon a pivot portion 162 (FIG. 8) that is journalled in a trough 164 (FIGS. 2 and 8) formed in a lever support member 166 appropriately disposed on an inner support wall 168 (FIG. 1) of cabinet 30.

Figure 9:
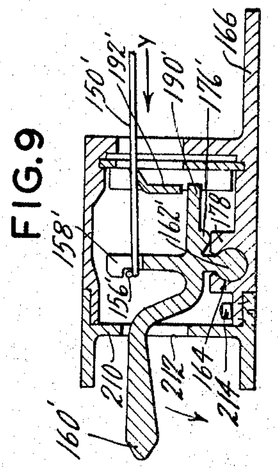
FIG. 9 is a sectional view taken on line 9—9 of FIG. 6.

An operating rod 150′ (FIGS. 2 and 3) is interconnected to bell crank 112′ by having an end 152′ thereof extend through an aperture formed in an arm 154′ of bell crank 112′. The other end 156′ (FIGS. 2 and 6) of operating rod 150′ is formed in the shape of a T lodged beneath a pair of lugs 158′, 159′ (FIGS. 2 and 7) formed on an actuating lever 160′ which also has formed thereon a pivot portion 162′ (FIG. 9) journalled in trough 164.

Figure 10:
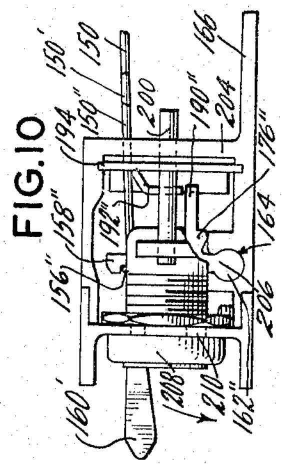
FIG. 10 is an elevational view of the right side of the lever and lock elements shown in FIG. 6.

An operating rod 150″ (FIGS. 2 and 7) is interconnected to bell crank 112″ by having an end 152″ thereof extend through an aperture formed in leg 154″ of bell crank 112″. The other end 156″ (FIGS. 2 and 6) of operating rod 150″ is formed in the shape of a T and lodged beneath a pair of lugs 158″, 159″ (FIGS. 2 and 7) formed on an actuating lever 160″ which also has formed thereon a pivot portion 162″ (FIG. 10) journalled in trough 164.

Figure 8:
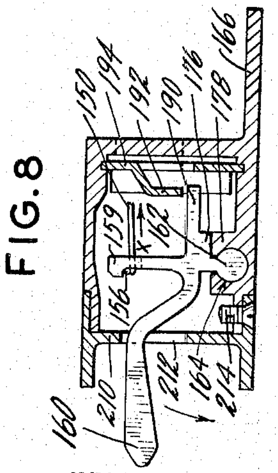
FIG. 8 is a sectional view taken on line 8—8 of FIG. 6.

The spring action of latch spring 80 (FIG. 2) on pull rod 110 through bell crank 112 maintains a bias on operating rod 150 in the direction of arrow X (FIG. 8). This action urges actuating lever 160 in the counterclockwise direction about the axis of rotation of its pivot portion 162 to maintain an abutment 176 formed on actuating lever 160 in engagement with a ledge 178 formed on lever support 166. In the same manner, latch spring 80′ through pull rod 130, bell crank 112′ and operating rod 150′ urges actuating lever 160′ in the counterclockwise direction (FIG. 9) about the axis of rotation of its pivot portion 162′ to maintain an abutment 176′ formed on actuating lever 160′ in engagement with ledge 178 of lever support 166; and latch spring 80″ through pull wire 140, bell crank 112″, and operating rod 150″ urges actuating lever 160″ (FIG. 10) about the axis of rotation of its pivot portion 162″ to maintain an abutment 176″ formed on actuating lever 160″ in engagement with ledge 178 of lever support 166.

From an inspection of the figures, it will be seen that actuation of one of the actuating levers such as actuating lever 160′ (FIG. 9) to rock same in the counterclockwise direction about the axis of rotation of its pivot portion 162′ will draw its actuating rod 150′ in the direction of arrow Y (FIG. 9) rocking bell crank 112′ (FIG. 2) in the counterclockwise direction about rock shaft 114 to move pull rod 130 upwardly and latch spring 80′ from its latching position (shown in full lines FIG. 1) to its unlatched position (shown in dot-dash lines FIG. 1). Such action removes nose 78′ of latch spring 80′ from its position of engagement with lip 76′ of catch plate 52′ of drawer 32′ and permits drawer opening spring 50′ to move drawer 32′ from its position confined within cabinet 30 (as shown for drawer 32 FIG. 1) to its position extending from cabinet 30 to expose the contents thereof. Similar operation of either actuating lever 160 or actuating lever 160″ results in a corresponding movement of latch spring 80 or latch spring 80″, release of drawer 32 or drawer 36 and opening thereof by drawer opening spring 50, or drawer opening spring 50″ respectively.

Depending upon the loading of the goods within drawers 32, 32′ or 36 the effect of drawer opening spring 50, 50′ or 50″ will be to open the drawer either partially or fully; however, once the drawer is opened even partially the user may grasp the front portion thereof and draw same out the rest of the way if need be. Return of drawer 32, 32′ or 36 by the user from its extended position (as shown for drawer 32′ in FIG. 1) to its position confined within cabinet 30 (as shown for drawer 32 FIG. 1) results in engagement of lip 76 of catch plate 52 with the appropriate nose 78 of latch spring 80 and a corresponding flexing of latch spring 80 until nose 78 passes and it is able to again drop behind lip 76 to retain drawer 32 in position confined within cabinet 30.

Locking ledges 190 (FIGS. 7 and 8), 190′ (FIGS. 7 and 9), and 190″ (FIGS. 7 and 10) are formed on actuating levers 160, 160′, and 160″ respectively for coaction with locking tabs 192 (FIGS. 7 and 8), 192′ (FIGS. 7 and 9), and 192″ (FIGS. 7 and 10) formed on a lock slide or bar 194 slidably disposed in a locking trough 196 (FIG. 1) formed in lever support 166. A lock slide actuating pin 200 (FIGS. 2, 7, and 10) extends through lock slide 194 and an aperture 202 (FIG. 7) appropriately formed in a rear wall 204 of lever support 166 and to a lock shuttle 206 carried by a substantially conventional barrel type key-actuated lock 208. A front plate 210 (FIGS. 2 and 9) formed with an aperture 212 (FIGS. 8 and 9) for accommodating lever actuators 160, 160′, and 160″ is secured to lever support 166 by appropriate means such as threaded fasteners 214 to form a protected housing for lever actuators 160, 160′, 160″, lock slide 194, and the other elements associated therewith.

Figures 6, 7:
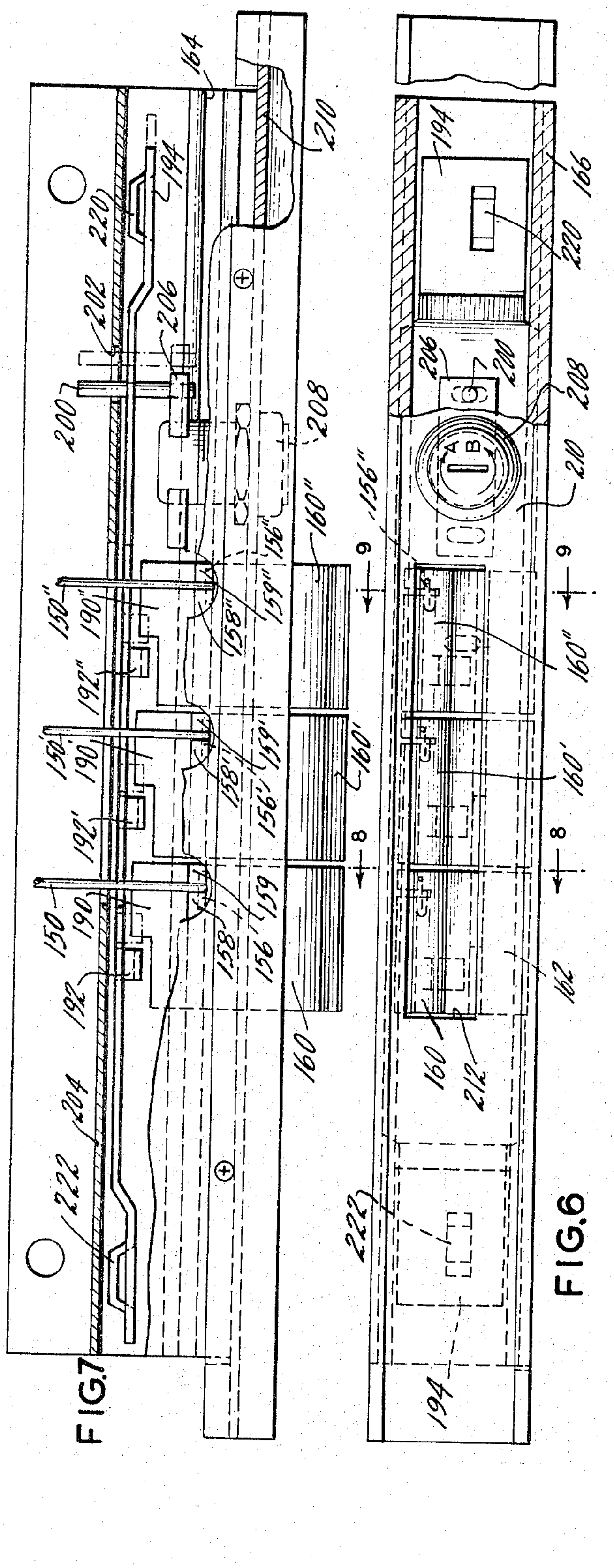
FIG. 6 is a front elevational view of the lever and lock elements of FIG. 1, cut away in part and in partial section to better show the details thereof.
FIG. 7 is a plan view of the lever and lock elements of FIG. 6 with the cover plate cut away in part to better show details of the lever and lock elements.

To lock lever actuators 160, 160′ and 160″ against operation and thus prevent release of latches 80, 80′, and 80″ and therefore opening of drawers 32, 32′ and 36 the user need only insert an appropriate key in lock 208 and rotate same in the direction of arrow A (FIG. 6). The conventional mechanism within lock 208 effects a movement of lock shuttle 206 from its unlocked position (as shown in solid lines in FIG. 7) to its locked position (as shown in dot-dash lines in FIG. 7) with locking tabs 192, 192′ and 192″ disposed over locking ledges 190, 190′ and 190″ respectively and thus prevents counterclockwise movement of lever actuators 160, 160′, 160″, release of their respective latch springs 80, 80′, 80″ and opening of associated drawers 32, 32′ and 36′ respectively. Rotation of lock 208 in the direction of arrow B (FIG. 6) returns lock slide 194 to its unlocked position (solid line FIG. 7) permitting actuation of actuators 160, 160′, 160″ respectively.

Figure 11:
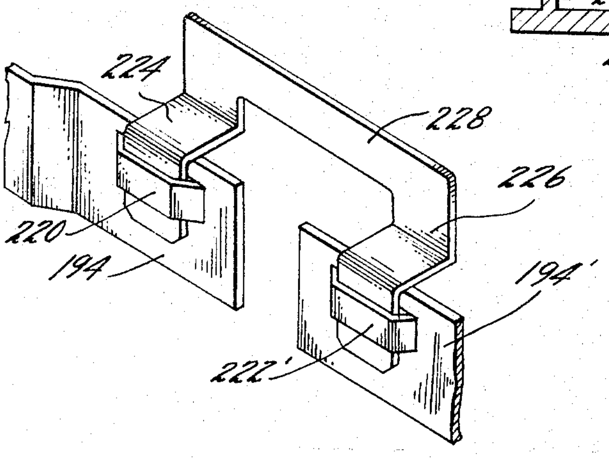
FIG. 11 is a perspective view showing a connector for interconnecting adjacent slide lock bars of the type shown in FIGS. 2 and 7.

A horizontally disposed strap 220 (FIGS. 7 and 11), is formed in the right end of lock slide bar 194 and a horizontally disposed strap 222 is formed in the left end of lock slide bar 194 to receive a leg 224 (FIG. 11) and a leg 226 of a lock slide connector 228. In this manner lock slide connector 228 can be used to interconnect a lock slide 194 with a lock slide 194′ of an adjacent cabinet to thus permit the locking action imparted to lock slide 194 through lock 208 to be transmitted through lock slide connector 228 to lock slide 194′ and thus obviate the need for a lock 208 in adjacent cabinets and of course the key associated therewith.

Figure 13:
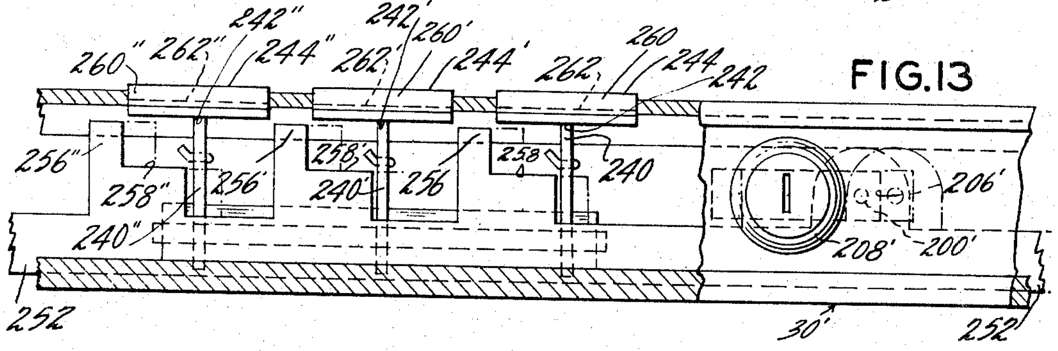
FIG. 13 is a front elevational view of the lever and locking apparatus of FIG. 12.
Figure 12:
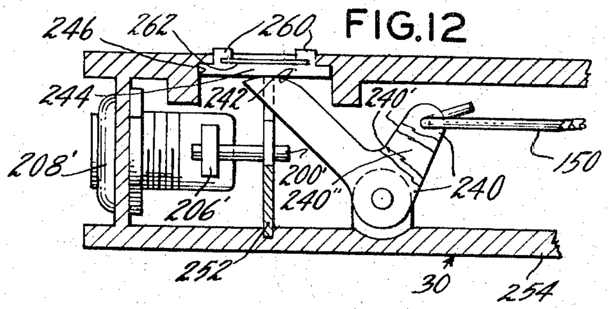
FIG. 12 shows a modified form of operating lever disposed for corporation with the latching and drawer operating apparatus of FIGS. 1 and 2 and adapted to be actuated by an indicia carrying push button; as well as the locking apparatus therefor.

Actuating rods 150 may also be connected to actuating levers 240 (FIGS. 12 and 13), 240′ (FIG. 13), and 240″ (FIG. 13) each formed with curved actuating ends 242 (FIGS. 12 and 13), 242′ (FIG. 13), and 242″, respectively, levers 240, 240′ and 240″ are disposed beneath and for coaction with pushbuttons 244 (FIGS. 12 and 13), 244′ and 244″ which are respectively disposed in apertures 246, 246′ and 246″ formed in the upper surface of a cabinet 30′. A lock slide bar 252 (FIGS. 12 and 13) is disposed in a slide carrier 254 appropriately supported in cabinet 30′ and interconnected with a tumbler lock 208′ through a shuttle 206′ and pin 200′ in a manner similar to that in which lock slide 194 is interconnected with lock 208 in the embodiment of FIG. 7.

A pushbutton locking tab 256 is formed on lock slide bar 252 and adapted for cooperation with pushbutton 244 while a pushbutton locking tab 256′ is formed on slide 252 for coaction with pushbutton 244′, and a pushbutton locking tab 256″ is formed on lock slide 252 for coaction with pushbutton 244″. In a similar manner a lever locking tab 258 is formed on lock slide bar 252 for cooperation with actuating lever 240, while a lever locking tab 258′ is formed on lock slide 252 for cooperation with actuating lever 240′, and a lever locking tab 258″ is formed on lock slide 252 for coaction with actuating lever 240″. Pushbutton locking tabs 256, 256′, and 256″ and lever locking tabs 258, 258′, and 258″ are disposed on lock slide bar 252 in such a manner as to permit the normal actuation of pushbuttons 244, 244′, and 244″ and cooperating thereof with lever actuators 240, 240′, and 240″ when lock 208′ is in its unlocked position. However, actuation of lock 208′ to move same to its locked position and thereby to move lock bar 252 to its locked position (as shown in dot-dash lines in FIG. 13) moves pushbutton locking tabs 256, 256′, and 256″ into the paths of movement of pushbuttons 244, 244′, and 244″ respectively and lever locking tabs 258, 258′, and 258″ into the path of movement of actuating levers 240, 240′, and 240″ respectively, thus preventing actuation not only of pushbuttons 244, 244′, and 244″ but also their associated actuating levers 240, 240′, and 240″. Since levers 240, 240′, and 240″ are prevented from actuation their respective operating rods 150, 150′, and 150″; bell cranks 112, 112′, and 112″; pull rods 110, 130, and 140; springs 80, 80′, and 80″ are prevented from movement and accordingly drawers 32, 32′, and 36′ associated therewith are locked in their positions confined within cabinet 30.

Figure 14:
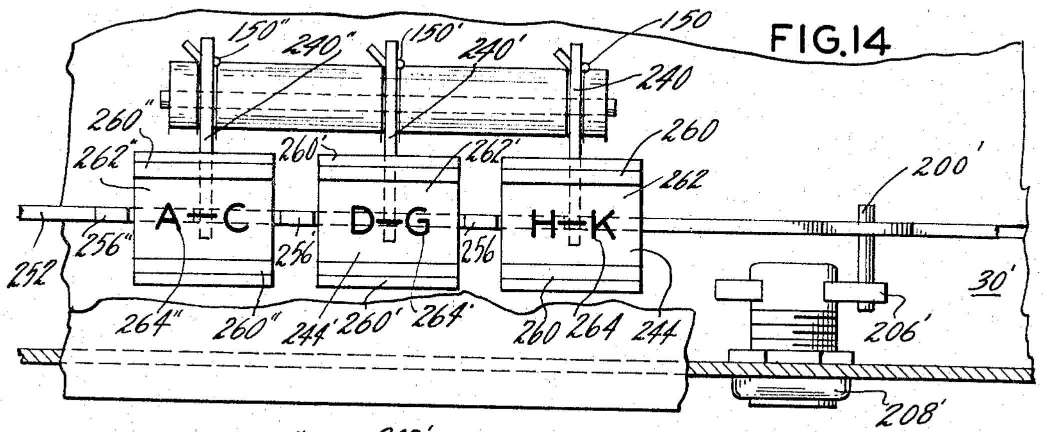
FIG. 14 is a plan view of the mechanism of FIGS. 12 and 13.

Undercut ridges 260 are formed on pushbutton 244 (FIGS. 12 and 14) to facilitate the placement upon pushbutton 244 of a card 262 or other suitable record upon which there may be placed information 264 concerning the contents of the drawer associated with the respective pushbutton 244. Similar undercut ridges 260′ and 260″ (FIG. 14) are formed on pushbuttons 244′ and 244″ respectively to accommodate cards 262′ and 262″ each bearing information 264′, 264″ concerning the contents of their associated drawers. Plastic covers (not shown) may also be placed beneath ridges 260, 260′, and 260″ to protect cards 262, 262′, and 262″ as well as the information disposed thereon.

From the above description it will thus be seen that a novel and improved component latching and moving mechanism has been provided for a cabinet, which, by utilizing a first leaf type spring for moving the component from a position housed within the cabinet to a position exposed therefrom and a second leaf type spring for latching the component in its housed position within the cabinet, minimizes the amount of structure normally required to accomplish the latching and moving functions. In addition, the utilization of straps and lanced projections formed from the material of a support plate and apertures formed in the leaf type springs provides an efficient and inexpensive manner for securely positioning the leaf type springs for cooperation with their respective components. The mechanism furthermore utilizes a lock slide bar connectable through a simple and inexpensive connector with other lock slide bars to obviate the need for more than a single lock, and is furthermore adaptable for use with pushbuttons carrying information indicative of the nature of the component associated therewith.

It is understood that although I have shown the preferred form of my invention that various modifications may be made in the details thereof without departing from the spirit as comprehended by the following claims.

I claim:

1. A component latching and moving apparatus: comprising (a) housing means;

(b) component means disposed in said housing means for movement between a position confined within said housing means and a position exposed from said housing means;

(c) first spring means disposed in said housing means for coaction with said component means to move same from its position confined within said housing means to its position exposed from said housing means;

(d) second spring means disposed in said housing means for coaction with said component means to latch same in its position confined within said housing means and against the bias of said first spring means; and (e) component release means associated with said second spring means for removing same from its position of coaction with said component means to permit said first spring means to move said component means.

2. The component latching and moving apparatus of claim 1: wherein (a) said component means includes a plurality of individual components each disposed in said housing means for independent movement between a position confined within said housing means and a position exposed from said housing means;

(b) said first spring means includes a plurality of springs each of which is disposed in said housing means for a coaction with one of said components; and (c) said second spring means includes a plurality of leaf type springs each disposed for latching cooperation with one of said components; and (d) said component release means includes a plurality of individual latch release levers each disposed for coaction with one of said leaf type springs.

3. The component latching and moving apparatus of claim 2: including locking means disposed for coaction with said component release means to prevent operation thereof and thereby movement of said components from their positions confined within said housing means.

4. The component latching and moving apparatus of claim 2: wherein (a) a push button is associated with each of said latch release levers; and (b) each of said push buttons is adapted to carry information indicating the nature of the component associated therewith.

5. Component locking apparatus: comprising (a) first housing means;

(b) a plurality of first components each disposed in said first housing means for movement between a position confined within said first housing means and a position exposed from said first housing means;

(c) a first lock bar movably disposed in said first housing means for movement between a locking position wherein it prevents movement of said first components and an unlocking position wherein it permits movement of said first components;

(d) lock means disposed in said first housing means for coaction with said first lock bar to move same between its locking and unlocking positions;

(e) second housing means;

(f) a plurality of second components each disposed in said second housing means for movement between a position confined within said second housing means and a position exposed from said second housing means;

(g) a second lock bar movably disposed in said second housing means for movement between a locking position wherein it prevents movement of said second components and an unlocking position wherein it permits movement of said second components; and (h) connector means interconnecting said first lock bar and said second lock bar so that operation of said first lock bar by said lock means results in a concurrent operation of said second lock bar.

6. The component locking apparatus of claim 5: wherein (a) said first lock bar includes at least one strap;
(b) said second lock bar includes at least one strap; and
(c) said connector means includes a first leg adapted to be received in said strap on said first lock bar and a second leg adapted to be received in said strap on said second lock bar.

7. The component locking apparatus of claim 6: wherein (a) said first lock bar and said second lock bar each include a first strap located proximate one end thereof and a second strap located proximate the other end thereof; and
(b) said first leg of said connector is disposed in said second strap on one of said lock bars and said first straps of the other of said lock bars.

8. The component locking apparatus of claim 6: wherein said straps are formed from the material of the lock bars.

9. A cabinet: comprising (a) casing means;
(b) drawer means disposed in said casing means for movement between a position confined within said casing means and a position extending from said casing means to expose the contents thereof;
(c) drawer opening spring means disposed in said casing means for cooperation with said drawer means to move said drawer means from its position confined within said casing means to its position extending from said casing means;
(d) drawer latching spring means disposed in said casing means for cooperation with said drawer means to latch said drawer means in a latched position confined within said casing means;
(e) said drawer latching spring means including a portion which cooperates with said drawer means to restrain same in its latched position; and
(f) latch release means disposed in said casing means for cooperation with said drawer latching spring means to release same from its latching cooperation with said drawer means to thus permit said drawer opening spring means to move said drawer means.

10. The cabinet of claim 9: wherein (a) said drawer means includes a plurality of individual drawers each disposed for independent movement between a position confined within said casing means and a position extending from said casing means;
(b) said drawer opening spring means includes a plurality of springs each disposed in said casing means for cooperation with one of said individual drawers;
(c) said drawer latching spring means includes a plurality of leaf type latch springs each disposed in said casing means for cooperation with one of said drawers; and
(d) said latch release means includes a plurality of individual latch releases each disposed in said casing means for cooperation with one of said latch springs.

11. The cabinet of claim 10: wherein (a) a spring support means is disposed in said casing means;
(b) a plurality of spaced pairs of spaced straps are carried by said support means, each pair of spaced straps being adapted to receive one of said springs to position same for cooperation with its respective drawer; and
(c) a projection is carried by said support proximate each pair of spaced straps for cooperation with an aperture appropriately formed in each of said springs;
(d) said pairs of spaced straps and said projections cooperating with said springs to retain same in position on said support means;
(e) said pairs of spaced straps and said projections being disposed to accommodate different arrangements of drawers.

12. The cabinet of claim 11: wherein said pairs of spaced straps and said projections are formed from the material of the support.

13. The cabinet of claim 9: wherein (a) said latch release means includes a lever disposed in said casing means for convenient operation by the user thereof; and
(b) locking means are disposed in said casing means for cooperation with said lever to prevent operation thereof.

14. The cabinet of claim 13: wherein (a) said locking means includes a bar slidably disposed in said casing means for movement between a first position wherein it does not interfere with said lever and a second position wherein it prevents operation of said lever; and
(b) a barrel type lock disposed for coaction with said bar to move same between its first and second positions.

15. The cabinet of claim 14: wherein (a) said bar includes a strap adapted to receive one leg of a connector; and
(b) another leg of said connector being adapted to be received in a similar strap on another bar disposed in an adjacent casing means such that movement of said bar results in concurrent movement of said another bar.

16. The cabinet of claim 9: wherein (a) a pushbutton is disposed for coaction with said latch release means to operate same; and
(b) said push button carries removable information indicative of the contents of the drawer means.

17. The cabinet of claim 10: wherein (a) a catch plate is carried by each of said drawers;
(b) a lip is carried by each of said catch plates;
(c) a nose is formed of each of said latch springs for cooperation with said lips;
(d) said latch releases each include a pull rod extending from a portion of their associated latch springs to a bell crank rockably disposed in said casing means and an operating rod extending from said bell crank to a lever rockably disposed in said casing means for access by the user.

18. A cabinet adapted for use as a pedestal of a desk, credenza, or the like: comprising (a) at least one casing unit;
(b) a plurality of drawers disposed in said casing unit for independent movement between positions confined within said casing unit and positions extending from said casing unit;
(c) a support plate disposed in said casing unit in proximity to and spaced from a rear wall of said drawers;
(d) said support plate having formed therein a plurality of pair of vertically disposed straps, a lanced projection proximate each of said pairs of vertically disposed straps, a plurality of pairs of horizontally disposed straps, and a lanced projection proximate each of said pairs of horizontally disposed straps;
(e) a drawer opening spring for each of said drawers, each of said drawer opening springs being formed from leaf type spring material, with a first portion thereof adapted to be disposed behind one pair of said pairs of vertically disposed straps and in front of said support plate and with an aperture adapted to receive the lanced projection disposed proximate the particular pair of straps, such that said support plate, straps, and lanced projection position and retain said drawer opening spring in position for a second portion of said drawer opening spring to coact with a selected one of said drawers in such a manner that when said selected drawer is in its position confined within said casing unit said drawer opening spring urges said drawer to its position extending from said casing unit;

(f) a drawer latching spring for each of said drawers, each of said drawer latching springs being formed from leaf type spring material, with an arm adapted to be disposed behind one pair of said pairs of horizontally disposed straps and in front of said support plate and with an aperture adapted to receive the lanced projection disposed proximate the particular pair of horizontally disposed straps such that said support plate, straps, and lanced projection, position and retain said drawer latching spring in position for a drawer latching nose formed on said drawer latching spring to coact with a selected one of said drawers, said drawer latching spring further being formed with an intermediate portion interconnecting said arm and said nose;

(g) a catch plate disposed on said rear wall of each of said drawers and formed with a lip disposed for coaction with said latching nose of said drawer latching spring;

(h) a plurality of bell cranks rockably disposed in said casing unit;

(i) a pull wire interconnecting each of said bell cranks with a respective one of said latching springs; and (j) an operating rod interconnecting each of said bell cranks with one of a plurality of operating levers;

(k) all of said operating levers being disposed in said casing unit for convenient operation by the user.

19. The cabinet of claim 18: including (a) a lock slide bar disposed in said casing unit for movement between a locking position wherein portions thereof coact with portions of said operating levers to restrict movement thereof and prevent release of said latching springs and their associated drawers, and an unlocked position wherein said operating levers are free for operation; and (b) a rotary-barrel key-controlled lock disposed in said casing unit for coaction with said lock slide bar to move same between its locking and unlocked positions.

20. The cabinet of claim 19: including (a) a second casing unit disposed in said cabinet adjacent said first casing unit and including a plurality of drawers each having associated therewith one of said drawer operating springs, drawer latching springs, catch plates, pull wires, bell cranks, operating rods, and operating levers;

(b) a lock slide bar disposed in said second casing unit for coaction with said operating levers; and (c) a connector interconnecting said lock slide bar disposed in said second casing unit with said lock slide bar disposed in said first casing unit such that operation of said first lock slide bar by said lock results in a corresponding operation of said second lock slide bar.

21. The cabinet of claim 20: wherein (a) said lock slide bar of said first casing unit includes at least one horizontally disposed strap;

(b) said lock slide bar of said second casing unit includes at least one horizontally disposed strap; and (c) said connector is formed as a substantially U-shaped member with a first leg adapted to be received in said horizontally disposed strap of said lock slide bar of said first casing unit and a second leg adapted to be received in said horizontally disposed strap of said lock slide bar of said second casing unit.

22. The cabinet of claim 19: wherein (a) each of said operating levers includes an operating portion, a pivot portion, an operating rod connecting portion, a locking portion, and an abutment portion;

(b) said casing unit includes a lever mounting member adapted to journal said pivot portions of said operating levers and provide a rest portion disposed for cooperation with said abutment portions of said operating levers;

(c) each of said levers is interconnected to its operating rod through said operating rod connecting portion such that the latching spring associated therewith urges the operating lever into a position with its abutment against said rest portion on said lever support;

(d) the locking portion of each of said levers being disposed for restraint by said lock slide bar when said lock slide bar is in locking position.

23. The cabinet of claim 19: wherein (a) a plurality of push buttons each associated with a respective one of said operating levers are disposed in said casing unit;

(b) each of said push buttons is formed with a pair of spaced undercut ridges adapted to have positioned thereunder an information bearing card to indicate the contents of the drawer associated with said push button and operating lever.

24. The cabinet of claim 23: wherein said lock bar slide carries push button restraining abutments adapted to prevent movement of said push buttons when said lock bar slide is in its locking position, and a plurality of lever restraining abutments adapted to prevent movement of said operating levers when said lock bar slide is in said locking position.

References Cited

UNITED STATES PATENTS

| | | | |
|---|---|---|---|
| 3,284,149 | 11/1966 | Lewin | 312—218 |
| 3,291,547 | 12/1966 | Foster | 312—219 X |
| 3,325,234 | 6/1967 | Lewin | 312—219 |

CASMIR A. NUNBERG, *Primary Examiner*.